United States Patent [19]

Pahr et al.

[11] Patent Number: 5,568,327
[45] Date of Patent: *Oct. 22, 1996

[54] METHOD FOR DETERMINING THE TAPE POSITION USING DEDICATED SERVO FORMAT

[75] Inventors: Per O. Pahr, Lier; Steinar J. Strand, Langhus; Erik Solhjell, Oslo, all of Norway

[73] Assignee: Tandberg Data AS, Oslo, Norway

[*] Notice: The term of this patent shall not extend beyond the expiration date of Pat. No. 5,394,277.

[21] Appl. No.: 338,085

[22] Filed: Dec. 7, 1994

Related U.S. Application Data

[62] Division of Ser. No. 755,411, Oct. 2, 1992, Pat. No. 5,394,277.

[30] Foreign Application Priority Data

May 13, 1992 [EP] European Pat. Off. .............. 92108079

[51] Int. Cl.$^6$ .............................. G11B 5/09; G11B 21/04; G11B 5/584
[52] U.S. Cl. ............................ 360/53; 360/70; 360/77.12
[58] Field of Search .................... 360/48, 72.2, 77.12, 360/78.02, 53, 70, 46, 49, 77.13

[56] References Cited

U.S. PATENT DOCUMENTS

| | | | |
|---|---|---|---|
| 4,121,264 | 10/1978 | Kishi et al. ................................ | 360/55 |
| 4,472,750 | 9/1984 | Klumpp et al. ...................... | 360/78.01 |
| 4,843,493 | 6/1989 | Furuhata et al. ..................... | 360/77.15 |
| 4,843,495 | 6/1989 | Georgis et al. ...................... | 360/73.08 |
| 4,868,692 | 9/1989 | Nakase et al. ......................... | 360/77.16 |
| 5,008,765 | 4/1991 | Youngquist ........................... | 360/77.12 |
| 5,121,270 | 6/1992 | Aludia et al. ......................... | 360/77.12 |
| 5,229,895 | 7/1993 | Schwarz et al. ...................... | 360/77.12 |
| 5,257,148 | 10/1993 | Solhjell et al. ....................... | 360/77.12 |
| 5,262,908 | 11/1993 | Iwamatsu et al. .................... | 360/78.02 |
| 5,280,402 | 1/1994 | Anderson et al. .................... | 360/78.02 |
| 5,305,155 | 4/1994 | Akagiri et al. ......................... | 360/72.2 |

OTHER PUBLICATIONS

Mee et al., "Magnetic Recording: vol. II Computer Data Storage", pp. 54–57.
Mee et al., "Magnetic Recording: vol. III Video, Audio, and Instrumentation Recording", pp. 52–55.
QIC–3000 Proposed Interchange Standard, Revision A, "Serial Recorded Magnetic Tape Cartridge for Information Interchange", pp. 1–35, Sep. 24, 1991.
QIC–91–42 Standard, Revision B, "Serial Recorded Magnetic Tape Cartridge for Information Interchange", pp. 1–40, Oct. 10, 1991.
QIC–CRF 1 Development Standard, Revision A, "Common Recording Format", pp. 1–60, Feb. 27, 1992.
QIC–91–43 Standard, Revision C, "Serial Recorded Magnetic Tape Cartridge for Information Interchange", pp. 1–48, Feb. 26, 1992.

*Primary Examiner*—Aristotelis Psitos
*Assistant Examiner*—Larry T. Cullen
*Attorney, Agent, or Firm*—Hill, Steadman & Simpson, A Professional Corporation

[57] ABSTRACT

Servo track pair position and longitudinal tape position is determined for a tape using dedicated servo format. The tape includes at least one set of data tracks and dedicated servo tracks wherein adjacent servo tracks are defined by longitudinal lines through the edges of erased or non-recorded tape portions. The information about servo track pair numbers and/or servo sample numbers is recorded into portions of the tape and is decoded and read back together with signals from the servo track. The information is recorded in a digital manner by using a digital block format of data blocks requiring less bytes per block than a data block provided on the data tracks. If information about longitudinal tape position is not required, information may be recorded in an analog manner using a fixed set of predetermined frequencies.

1 Claim, 4 Drawing Sheets

FIG. 3

| BYTE 0 | BYTE 1 | BYTE 2 | BYTE 3 | ::: | BYTE n-1 | BYTE n | ECC 0 | ECC 1 |

FIG. 4

| DATA BYTE | CONTROL BYTE | |
|---|---|---|
| | CRC BITS | SYNC BITS |

FIG. 5

| DATA AND ECC BLOCK | DATA AND ECC BLOCK |

METHOD FOR DETERMINING THE TAPE POSITION USING DEDICATED SERVO FORMAT

This is a division of application Ser. No. 07/955,411 U.S. Pat. No. 5,394,277, filed Oct. 2, 1992.

BACKGROUND OF THE INVENTION

The present invention generally relates to a method for determining the servo track pair position and, optionally, the longitudinal tape position for a tape using dedicated servo formats. The tape includes at least one set of data tracks and dedicated servo tracks wherein adjacent servo tracks are defined by longitudinal lines through the edges of erased or non-recorded tape portions. In addition, the present invention further relates to an apparatus for performing the method.

The dedicated servo format for use on ¼" tape cartridge streamers relies on prerecorded servo tracks. The servo and data track positions are placed according to the principles described in U.S. Pat. No. 5,008,765. However, no teaching is present in the prior art on how to implement the physical servo tracks, but only the layout of the center lines for data and servo tracks can be ascertained from this patent. Furthermore, the following documents QIC-91-41 (QIC-1 CF), Revision B: "Common Recording Format Specification" (Oct. 8, 1991) and QIC-91-42 (QIC-10 GB), Revision B: "Serial Recorded Magnetic Tape Cartridge for Information Interchange" (Oct. 10, 1991) define the physical and logical layout of the servo and data tracks for the 10 GByte standard. QIC-3000, Revision A: "Proposed Interchange Standard Serial Recorded Magnetic Tape Cartridge for Information Interchange" (Sep. 24, 1991) defines the layout for the 3 GByte standard for 144 data tracks and 24 servo tracks.

A servo demodulation scheme has been proposed; however, since no track position information encoded into the servo tracks themselves is present, a drive-embedded microcontroller must be provided which at least implicitly cares for following the tracks numbers.

This principle is well-known from hard disk drives with a dedicated servo wherein the microcontroller counts cylinder pulses issued when the servo and data heads are moved radially over the tracks, and therefore, can always provide information on which track the servo head is located. This is described in Mee and Daniel, "Magnetic Recording", Vol 2: Data Storage, McGraw-Hill Book Company 1988, pp. 55–57. Since the disc spins at a constant angular velocity and the centers of the cylinders do not move with respect to the servo tracks, except for further known thermal expansions and small mechanical vibrations, reliable results can be obtained. However, this principle may fail when tapes are used for two reasons: namely, the problem of track repeatability and the inherent physical friction between the tape and the magnetic recording head.

In a tape drive using a serpentine 10 GByte recording format, the servo tracks will wander with respect to the tape edge, and the tape itself always moves with respect to the cartridge base plate or the reference plane. As a result, the tape moves with respect to the magnetic recording head when the servo is not enabled. According to the above-mentioned QIC standards, the servo track wander is specified to be within +/−25.4 micrometers with respect to the lower tape edge. The movement of the tape with respect to the cartridge reference plane is specified as "track repeatability" or "dynamic tape movement" and is, according to the above standards, +/−12.7 micrometers in one direction. However, if the tape transport stops during running and the drive backspaces without servo control, the track repeatability is specified as 25.4 μm in a worst case. If the tape starts up in the original direction again, the repeatability is 12.7 μm. The situation is typically encountered during a data append operation.

A further specification for the ¼" cartridge includes the clearance between the tape guides and the tape. With a worst-case wide guide and a worst-case narrow tape, this clearance is specified to be 46 μm for most of the ¼" cartridges in use today. Furthermore, laboratory measurements based on optical detection of the tape movements show that the tape may slip on the tape guides. Normally, these types of dynamic track movements are within the specification for the cartridge. However, a risk exists that the tape movements may be larger, for example, when the tape is accelerated, negatively and positively, during a wind-rewind operation and again during a data append operation. Abrupt tape movements can, in principle, occur when the tape is located with the center line over the midpoint of a tape guide. The tape may slip quickly to one of the sides from this unstable position. This situation may most likely occur when the tape guides are nearly perpendicular to the cartridge base plate or reference plane. Furthermore, the tape may have been stabilized at one side of the guides leaving a gap of up to a maximum of 46 μm. When data is appended to the tape in another drive located in a vertical position (i.e. within horizontal tape guides), abrupt changes of more than 25.4 μm may take place.

If the dynamic tape movements are within, for example, +20 μm during the tape speed ramp-up and rewind operation before the servo is enabled, the actual servo track wanders at the same time within specifications of, for example, +15 μm during the backspace operation. Additionally, the position of the center line of the actual servo track of the tape will deviate +35 μm from the center of the magnetic recording head, i.e. from the center of the servo head or servo heads. Now, the track pitch on 3 GByte-10 GByte tape formats is defined to be 35 μm, and therefore, the center of the servo head(s) will be located near the center of the nominal position of a neighbor track. If the servo attempts to lock, it will fail due to the wrong polarity of the position feedback signal. A decision on whether the servo is located above or below the desired track is not possible or at least very difficult to reliably determine.

The lack of servo track pair numbering may also cause problems when the track pitch is decreased in future ¼" tape formats. The error may not be capable of being detected in some cases, and data will unavoidably be overwritten.

Normally, the actual track repeatability of a signal cartridge sample investigated in a laboratory will be much better than its specification. However, cartridges may be mass-produced in millions of units, and during normal use, they may also be subject to temperature and humidity changes as well as tape wear. Under all these conditions, data integrity must be guaranteed. The servo system must always find the correct track number for all cartridges and under all changes in environmental conditions.

In addition, the reliability of the proposed QIC servo format is affected by head-to-tape friction. The read heads used for the servo are the same heads as used for the data signals (in total three channels with 6 read gaps of which either one channel (two read gaps at a time) may be used for the servo). Due to low-frequency noise from the magnetoresistive (MR-) element itself (noise induced in the magnetoresistive element because tape asperities cause varying thermal cooling of the element) and the DC-bias current used for the MR-element, the read channels are AC-coupled. A typical high-pass frequency may be about: 50 kHz. Further, the servo signal must be demodulated. When the tape speed changes, the carrier frequency also changes with, the same percentage. Depending on the actual servo demodulator technique used (fixed-frequency front-end bandpass filters etc.), building a frequency-tracking demodulator may be more or less expensive. Typically, the demodulator may be built for a narrow range of fixed tape speeds, all with carrier frequencies placed above the AC-coupling high-pass frequency.

When the end of the tape approaches, the ¼" tape drives in use today prepare for a track shift by stopping the tape and moving the head to the location of the next track set to follow. With the 3 GByte/10 GByte tape drives as specified according to the QIC standard, the servo must be disabled during this operation. Thereafter, the tape accelerated in the opposite direction and the servo system tries to lock on the correct servo track., The servo system cannot be active during the complete ramp-down and ramp-up time intervals since the tape speed is considerably reduced, and the servo carrier frequency is also reduced. The signal-to-noise ratio may begin to be degraded, as well, depending on where the cutoff frequency of the system has been placed. The performance of the servo system will also be degraded due to undersampling, and it must be shut off. This may be due to the fact that all transversal tape motions are not to scale with tape speed. Further, other difficulties resulting from characteristic frequency components found in the transversal tape vibrations result in tape slips occurring even at low tape speed. Therefore, the servo heads may be more or less off track after the ramp-down period.

Due to friction between the tape and the head, the tape may stick to the head when it is moved in a direction perpendicular to the tape. This may be observed on a statistical basis as a combination of variations from cartridge to cartridge, variations in humidity, temperature, tape tension, tape position on the tape guide, tape surface conditions, such as more or less worn tapes, and magnetic head surface conditions. Again, the relative effect on the track position from the tape-to-head friction will be greater when the track pitch decreases.

Therefore, moving the head from one track to another without running the tape at full speed cannot be recommended. Track shift must take place before the tape has been stopped or just after it has been accelerated to full speed again in the opposite direction.

When the tape has been stopped and then started again, the servo firmware must also perform a verification of correct polarity of the feedback signal to check if the heads are located on an even or an odd servo track and compare this polarity with the required value. Further, even if the polarity is correct and the servo can lock, the track position may be in error. If the servo cannot lock, the write operation must be stopped by the control firmware and start to count tracks from a known vertical position either below or above the actual servo band. This re-counting must be performed while the tape is running and will cause a delay in the actual tape drive operation, and the streaming operation cannot be maintained. Recounting of tracks may be difficult and time consuming for a tape drive servo mechanism due to mechanical and reliability reasons. Due to the serpentine nature of the tape drive in contrast to the cyclical nature of a hard file or hard disk, the preferred method for moving the head is a combination of a stepper motor with a broad operating range and a linear, analog actuator operating over a very limited, narrow range. This results in the lowest overall costs and the greatest resistance to mechanical shocks. However, even when a linear, high speed actuator capable of moving the head over a broad operating range is used in a high-performance, high-speed track seeking servo, a need for high reliability exists.

The problems increase for a future tape format when the track pitch is decreased. If the track repeatability of the cartridge in the position of the servo tracks with respect to the tape edge are not improved considerably, the possibility exists that the servo heads may be located two pitches above or below the desired position. Since no track information is encoded into the servo tracks themselves, recorded data may be overwritten and lost.

Methods for automatic tracking are well known, for instance, in consumer video recorders as described in Mee and Daniel, "Magnetic Recording", Volume 3: "Video Recording", McGraw-Hill Book Company, 1988, pp. 53–54. The four-tone frequency method disclosed therein for analog video recorders consists in a recording of four low-frequency pilot tones, each tone being frequency multiplexed with the video recording signal. In addition, all pilot tones are spaced multiplexed cyclically with four video frames or tracks. The video read head, when slightly off-track, senses its own pilot signal and a portion from the neighbor track pilot signal. The ratio of the neighbor track pilot signal to its own pilot signal determines the deviation from the desired position. The face or polarity to be used for the feedback signal is determined by the actual frequency band of the different signal which follows after analog mixture of the two actual pilot signals are detected. The difference frequency detected determines in which direction the head is to be moved.

For helical scan video and data recorders, several other methods exist as alternatives to the four frequency pilot tone method. Some of these are based on recording special patterns of frequency bursts, typically from 2 to 4 possible frequencies, in the beginning of each track. These bursts are space-multiplexed both in the direction of the tracks and along the direction of the tape, as disclosed in U.S. Pat. Nos. 4,121,264, 4,843,493 and 4,843,495. These methods, however, sample the tracking error only once at the beginning of each video or data track. Another method based on obtaining continuous servo information along the tracks is based on azimuth recording and the measurements of timing differences, as described in U.S. Pat. No. 4,868,692.

It is common to all these methods that the tracks are not numbered and only relative positioning information can be demodulated and used for the error signal input to the servo, e.g. the encoded frequency patterns are part of the positioning measurement system of the tracking servo.

SUMMARY OF THE INVENTION

It is, therefore, an object of the present invention to improve the servo format of a serpentined recorded tape using a dedicated servo format such that the system may always identify on which track the servo heads are located and so that data integrity may be maintained during the write operation under all environmental conditions and under the statistical scattering encountered during high-volume production of cartridges.

According to the invention, information about servo track pair numbers and/or servo sample numbers may be recorded into erased or non-recorded tape portions and may be decoded and read back together with signals from said servo tracks.

The invention further describes two different identification coding formats. According to a preferred embodiment, the information may be recorded in a digital manner by using a digital block format of data blocks requiring preferentially less: bytes per block than a data block provided on the data tracks. It will, therefore, require extra hardware for decoding, i.e. the normal data decoders must have an option for decoding the identification and position signal. However, the normal read and data channels may be used for data filtering and synchronization with minor modification required for low pass filtering of the input to the servo demodulator. Information may alternatively be recorded in an analog manner using a fixed set of predetermined frequencies.

The second format requires modifications to the conventional read channels and servo demodulators for the 3 GByte/10 GByte tape drives. However, it does not provide more than a relative track numbering, and there is no encoded information for the tape position. The tape position itself, therefore, must be found by counting the number of servo samples and only a relative number results, i.e. when the operation is stopped. It is not possible to count the exact number of servo samples since the servo system must be disabled at low tape speeds. This is, for example, intended for use with rather wide track pitches, e.g. a 34 μm pitch.

As to the digital format, at least one error correction character should be provided. As a result, a good protection against read operation problems may be achieved. Such error correction characters should be used in addition to the normal data.

The data bytes may be recorded as usual. At the end of a byte sequence, at least one error correction character byte is included. Such bytes may be generated using one of many mathematical methods, such as generating error correction characters by combining even-numbered data bytes including exclusive-or operations and doing the same for odd-numbered data bytes. If one of the data bytes is detected as bad during the read operation, a corresponding exclusive-or operation may be performed including all the other even-numbered or odd-numbered data bytes, respectively, and an error-corrected character may be generated. More powerful error correction methods, like the Reed-Solomon system, may also be used.

Preferably, each byte in a data block provided according to the digital block format should be coupled with a control byte. The control bytes may be used for parity control or the like. A powerful instrument results if the control byte contains two different groups of information with the first one including cyclic redundancy information generated from the contents of the data byte and the second group containing some bits used for synchronization of the read channel.

In addition, the control byte may also be used to record the information about servo track pair numbers and servo sample numbers from a sequence of identical data blocks within one single servo sample. By introducing this redundancy, the control system may have more opportunities to read back the data contents correctly even if the tapes are worn and difficult to read.

An apparatus determines the tape position relative to servo read channels for a tape using dedicated servo format. The tape includes at least one set of data tracks and dedicated servo tracks with center lines which coincide with and are defined by the longitudinal edges of erased or non-recorded rectangles in a continuous density servo carrier recording and where the information about each servo track-pair and longitudinal tape position servo sample number may be recorded into the rectangles just after they have been erased or created during the manufacturing process of the tape. The apparatus includes at least multiple channel head means with a head having at least three channels for accessing tracks on the tape. A servo demodulator means regains information from the signal obtained from servo tracks through the multiple channel head means. A low pass filter for each servo demodulator means may be arranged upstream the associated servo demodulator means wherein the cutoff frequency of each low pass filter is set above the frequency of the servo carrier wave. In addition, means for determining the tape position from the information about servo track pair numbers and/or servo sample numbers previously recorded in the tape portions are provided.

Preferably, the means for determining the tape position may be a module included within a data decoder which is normally present since it may also be designed to recover information from the normally recorded data tracks. As a result, a position may be accurately monitored when the servo head traverses the servo tracks. Also, when the servo channel is switched to a new read channel, there is no need to actually detect every servo track position. In particular, with the digital block format, the invention provides for noise immune detection.

This occurs by moving the head and the servo channel to target track transversal and tape longitudinal positions during a "write append" or "quick file access" operation by starting the capstan motor and the head stepper/head actuator and moving the head and the tape in the desired directions. The movement of the head may be very quick (approximately one second); however, this duration is relatively slow compared with the time scale of the servo sample durations. A need of about one second per 5 mm movement will be typical. If a servo rectangle is assumed to be one pitch wide, i.e. 34 μm, whereas the read gap width is 19 μm, the time duration during which the read gap is fully within one rectangle is 34 μm minus 10 μm per 5 mm per second which equals 3 ms. Since the duration of one servo period is 0.1 ms, thirty samples may be read from each servo head. If strong error correction is provided, the signal can also be read at half amplitudes when the read gap is just over the center line of the servo track. The method, will also be applicable for tape formats with extreme narrow pitches, that is, at least 100 GByte tape streamers.

Success of the digital encoding format is further evident in that the head positioning servo is able to recover after a mechanical shock by repositioning quickly and verifying that it locks on the correct track. If extreme shock occurs and the servo does not follow, the write current may be shut off momentarily and may cause the write process to be terminated. According to the measurements provided in the prior art, a track recounting procedure has to be started. By contrast, the present invention allows the tape to backspace—if the duration of the shock was very long—or even go directly to the desired track position for rewriting the data without stopping the tape provided this is possible within the specification for the track format. In this way, streaming operation may be maintained under extreme environmental conditions.

Additional features and advantages of the present invention are described, and will be apparent from, the detailed description of the presently preferred embodiments and from the drawings.

BRIEF DESCRIPTION OF THE DRAWINGS

FIG. 3 is a tape showing data bytes and error correction characters.

FIG. 4 schematically illustrates a data byte connected with a control byte.

FIG. 5 schematically illustrates obtaining redundancy and reading back data.

DETAILED DESCRIPTION OF THE PRESENTLY PREFERRED EMBODIMENTS

Figure 1:
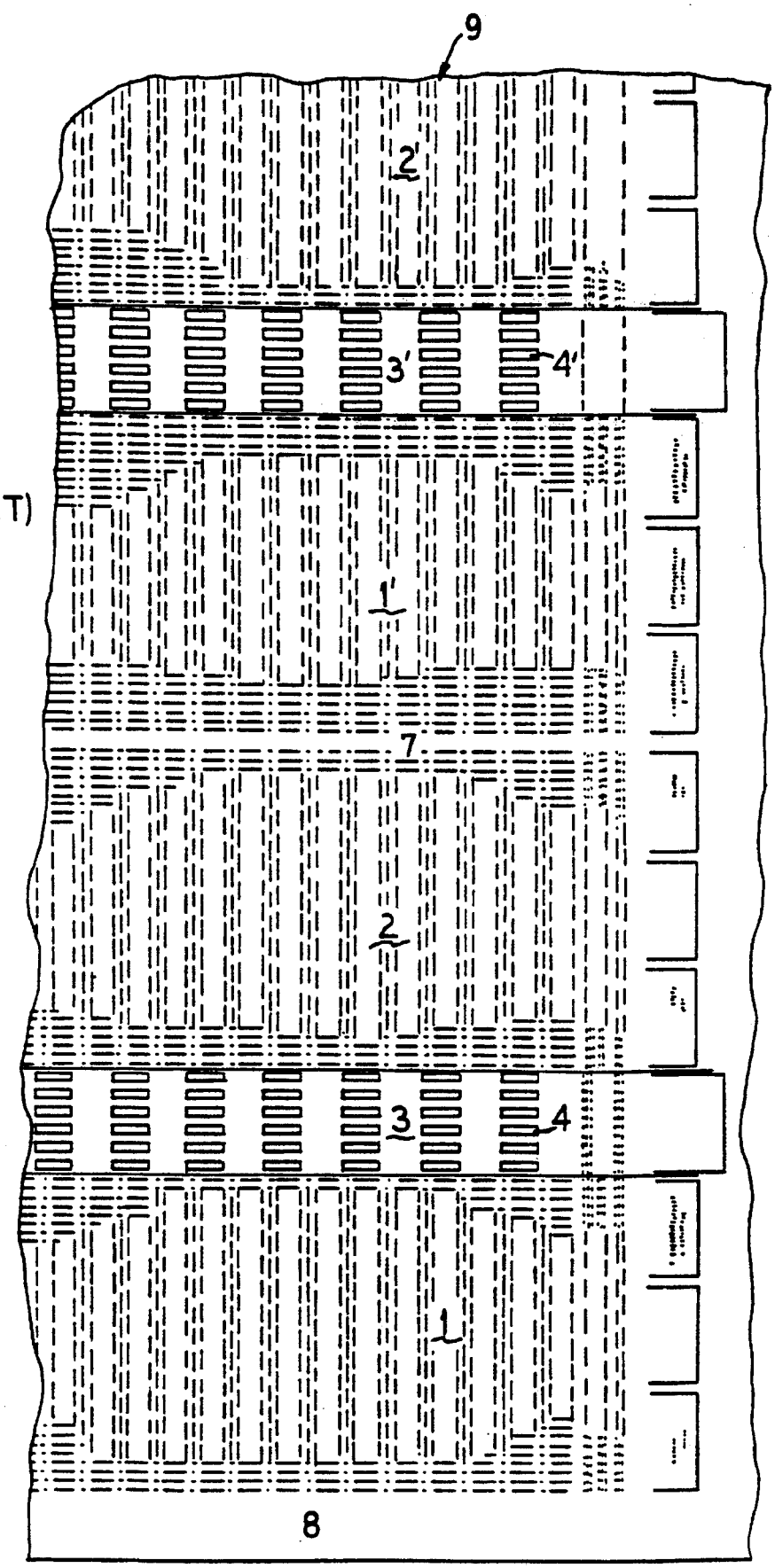
FIG. 1 illustrates a design for servo tracks and data tracks.

FIG. 1 illustrates a design of data and servo tracks as disclosed in QIC91-42. The tracks on the tape may be divided into two physical portions 8, 9 separated by a center band 7, each including two sets of 36 data tracks 1, 2 and 1', 2', respectively, and a set of 12 servo tracks 3 and 3' respectively, embedded between the respective sets of data tracks 1, 2 and 1', 2'. The portions 8, 9 are located on the lower part of the tape and the upper part of the tape, respectively. The data tracks 1, 2 associated with the lower servo portion 8 (between lower portion 8 and center band 7) are recorded, and then the tracks 1', 2' associated with the upper portion 9 (between center band 7 and upper portion 9) are recorded. The method and apparatus for the recording of each portion 8 and 9 are disclosed in U.S. Pat. No. 5,008,765 the disclosure of which is herein incorporated by reference.

In ¼" tape servo format as illustrated in FIG. 1, erase or non-recorded tape portions 4, 4' consist of rectangles which have been erased during a continuous recording of a carrier wave. The carrier waves fill the portions between the erased or non-recorded rectangles 4, 4', but are not illustrated in FIG 1. The center line of each servo track coincides with the edges of the rectangles 4, 4'. Therefore, the rectangles 4, 4' form an empty tape area which may be used for recording information signals. Each rectangle may contain a single servo track pair position number. The number is, therefore, shared by both the lower (even) servo track and upper (odd) servo track associated with each rectangle 4. When the servo is locked on either the odd or even track, the chosen polarity of the servo error signal determines if the track is odd or even. That is, the servo may not lock if the polarity is accidentally in error. This provides a simple and foolproof method.

A physical number corresponding to the longitudinal tape position of the servo pulses may also be encoded into the rectangles 4, 4' i.e. in the erased or nonrecorded tape portions This may facilitate certain tape drive operations, for instance, an implementation of a QIC File Access Function may be provided as an option in the QIC standard. The mean longitudinal position of the servo heads with respect to the tape may then be calculated, and the calculated position substantially estimates the position of the write head.

The physical recording method for the servo band and its corresponding tracks consist of a one-band wide recording with a servo carrier frequency (not shown in FIG. 1). The rectangles 4 have been erased into the continuous recording of the tape with the density corresponding to a read frequency of 400 kHz at a tape running speed of 120 inches per second. A center line of each servo track 3, 3' is located along the edges of the erased or non-recorded rectangles 4, 4', respectively. Therefore, six rows of rectangles 4, 4' and twelve servo tracks exist in each of the two servo bands. Numbers for the servo track pair of servo sample numbers may be recorded into the rectangles 4, 4' and, when necessary for determining the tape position, read back into the two read channels and decoded simultaneously with a low pass/band pass filtered version of the same read signals and may be passed onto two corresponding servo demodulators as described below with reference to FIG. 6.

Figure 2:
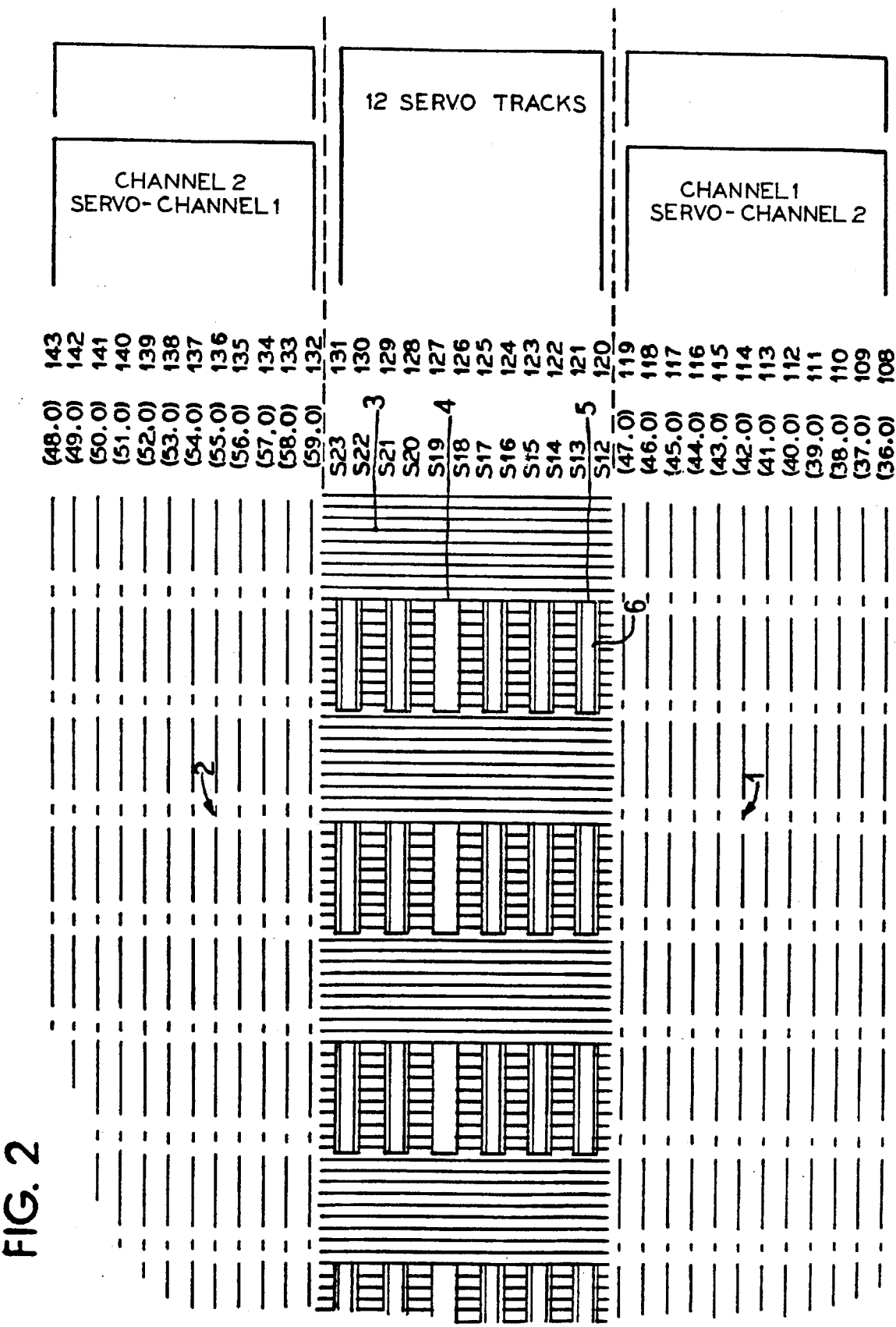
FIG. 2 is an enlarged view of a portion of FIG. 1.

FIG. 2 illustrates an exploded view of a portion of FIG. 1. Magnetic recording of a servo carrier frequency has been indicated wherein the vertical lines illustrate transitions in magnetization on the tape. The rate of the servo samples is the same as the rate at which the "black" rectangles 4 occur. When the tape speed is 120 IPS, the sample rate is 10 kHz. In FIG. 2, the rate of the transitions 3 (positive and negative) is 189.3 kHz. The servo sample track pair position information is recorded with a much higher transition rate than the servo carrier. These transitions are, therefore, shown as "black" areas in the rectangles 4. If a (1, 7) ⅔ code is used, the rate of the lowest transition frequency will be 762 kHz at 120 inches per second.

As indicated in FIG. 2, an option exists for the recording which lies between the servo track center lines for tracks S12 and S13. At this point, the servo track pair identification signal recording 5 is shown with a certain spacing 6 to the horizontal edges of the servo recording 3. The spacing 6 may be used when the longitudinal tape position coding is not used, i.e. when a set of fixed identification signals are used, the identification when the center of the read gaps are located at a pitch from servo track center lines may be read, that is, in the middle of the rectangles 4. By doing so, the low pass filter requirement for the servo demodulator is not as strong. In FIG. 2, the pitch or distance between data and servo tracks is 34 μm whereas the width of the read gap will be 19.5 μm (read gap width and location are not shown).

FIG. 3 illustrates a layout of data bytes and error correction characters (ECC). The error correction characters are added at the end of the data byte sequence. The error correction characters may be generated, for instance, according to a simple method implementing an exclusive-or function of all even-numbered bytes and placing the result in ECC 0. Then, all odd-numbered bytes are also passed through an exclusive-or function, and this result is placed in ECC 1. If, then, for example, byte 2 is detected as being bad, it can be recorded by taking the exclusive-or function of all the other even-numbered bytes including bytes in ECC 0.

For the system to properly function, each data byte should contain some control bits in addition to the data bits. The control bits are used to detect an error in the reading of each byte. For example, six bits in each data byte may be used for normal data, and two bits may be used for parity control.

FIG. 4 illustrates another possibility wherein each data byte may be coupled with a control byte. The data byte contains one byte of data. The following control byte contains two different groups of information. The first group, which may be two or five bits long, contains special cyclic redundancy information generated from the contents of the data byte. This cyclic redundancy information may be used during reading to detect if some of the bits in the byte have been read incorrectly. In this way, the system may quickly determine if a byte is bad and then may use an error correction method. The second group of the control byte contains some bits used for synchronization of the read channel. By incorporating these bits in the control byte, the system is always synchronized before reading of the next data byte begins, except in the case of a read head drop out.

The pattern used for this part of the control byte depends upon the type of encoding scheme used.

FIG. 5 illustrates how redundancy may be obtained by twice repeating the whole block shown in FIG. 3 which may contain bytes generated by the method used in FIG. 4. Three or more repetitions may also be provided. By introducing this redundancy, the control system will have more opportunities to read back the data contents correctly, even in difficult cases which may occur if the tapes are worn or the like. It may seem that this extensive redundancy in error correction may not be needed because redundancy is inherent due to repeated readings of the samples, i.e. the information content of the track number does not change from sample to sample when reading along a single servo track. Regarding the counting of pulses, the exact position may also not be needed because the frame numbers (physical and logical) may be counted when reading data on the actual track when the servo is in lock. However, this kind of redundancy enables monitoring the tape position accurately which has the advantages outlined above. Due to the normal procedure of rewriting blocks and frames and keeping the same physical numbers, the tape position may not be accurately determined.

Figure 6:
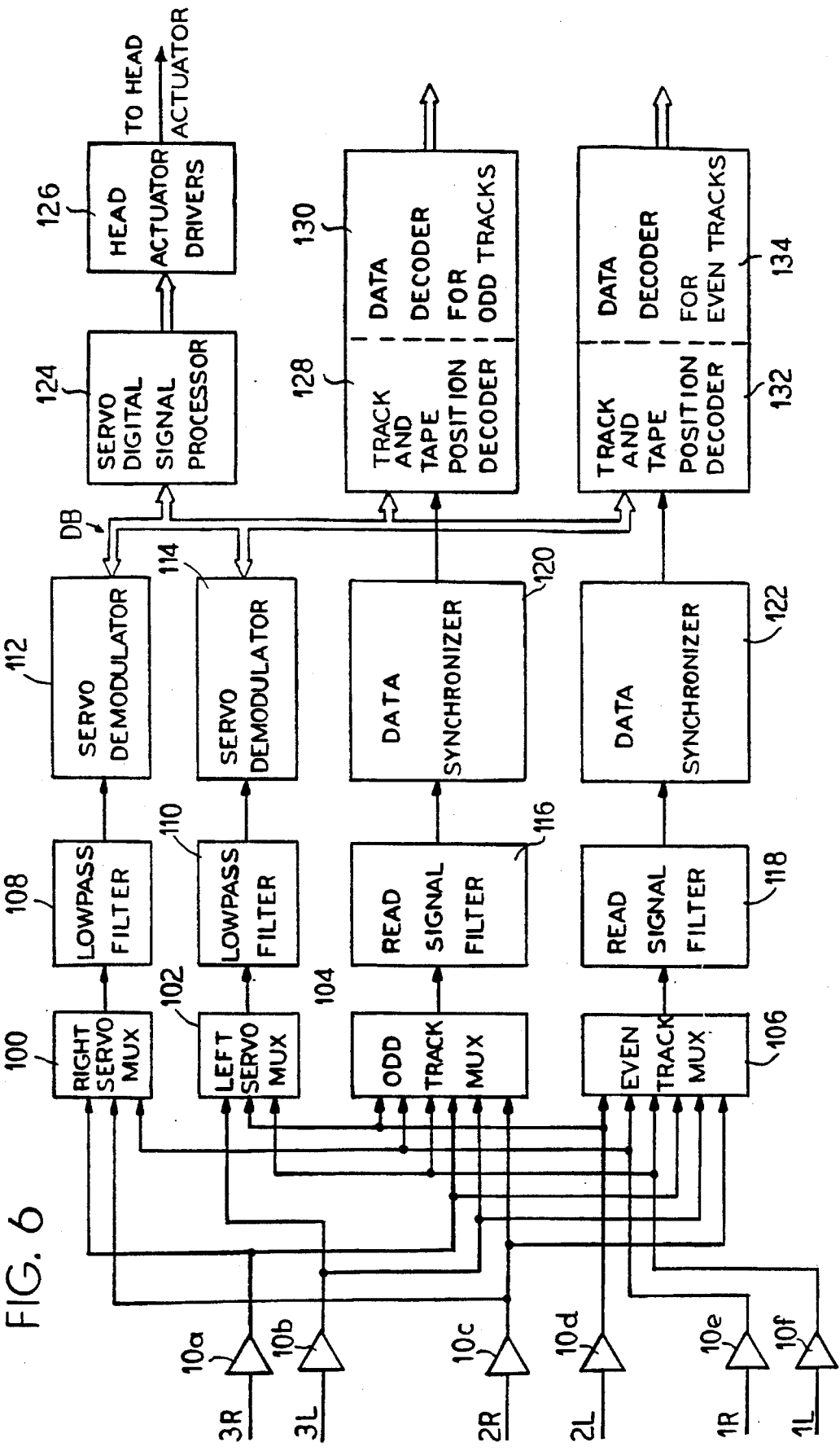
FIG. 6 illustrates an apparatus designed to perform the method of the present invention.

FIG. 6 illustrates an example of an apparatus designed along with the encoding in a digital format. A read head (not shown) sends signals through channels 1L, 1R, 2L, 2R, 3L and 3R where R and L designate left and right channels, respectively. When looking down to the front of the magnetic recording head, the read gaps lie both to the left and right of the write gaps. Right and left servo multiplexers 100, 102 and odd track and even track multiplexers 104, 106 select the actual signal lines to be set up for the servo demodulators 112, 114 and for the even-track and odd-track read channels.

Data synchronization is performed in the normal way, and the serial bit stream is passed onto the track and tape position decoders 128, 132 which communicate with a servo digital signal processor 124 through data bus DB. The servo digital signal processor 124 affects head actuator drivers 126 which in turn move the heads as required. The signals from the left and right servo multiplexers 100, 102 are passed to respective low pass filters 108, 110 before entering into the servo demodulator 112, 114. The cut-off frequency for the low pass filter will be placed above the servo carrier frequency. The cut-off frequency may also be varied according to the actual tape speed used, and the servo demodulators 112, 114 may also include band pass filters (not shown) centered around the actual carrier frequency.

Signals from the odd-track and even-track multiplexers 104, 106 are passed through data synchronizers 120, 122 to a data decoder 130 for odd tracks or a data decoder 134 for even tracks, respectively. The track and tape position decoders 128, 132 and the data decoders 130, 134 are designed such that the track and tape position decoders 128, 132 form a separate module within the respective data decoder 130, 134.

During normal servo operation, at a tape speed of 120 inches per second, the carrier is modulated with 10 kHz. To recover the servo signal, both the upper and lower sidebands are normally needed for demodulation, and the servo demodulators 112, 114, therefore, normally include a bandpass filter centered around the actual carrier frequency to improve the signal-to-noise ratio of the detector. Also when the tape speed is changed, for example, to lower the effective data rate to and from the storage device, the low pass filters 108, 110 must be switched to a lower cutoff frequency.

The servo carrier frequency must be selected somewhat higher than the modulation frequency of 10 kHz at 120 inches per second. The servo samples may be demodulated with synchronous detection of the carrier. The servo format is well suited for synchronous detection because the servo carrier is always present when the servo head is within its normal operating range, i.e. the carrier is always present with a sufficient amplitude for regeneration before the lock command is given to the servo system.

Therefore, the servo carrier frequency may be placed, for example, at 100 kHz, and the servo signal may be detected and low-pass filtered with good noise suppression of the carrier with simple active low pass filters from fourth to sixth order.

The highest recording density of the (1,7) ⅔ code used in the QIC standards corresponds to a frequency of 3048 kHz at a tape speed of 120 inches per second. The lowest-density frequency for this code is 762 kHz at the same speed. The signal spectrum may have much lower frequency components especially for some worst case patterns, Further, the tape longitudinal position encoding ensures that the block pattern will not be constant for a single track. The block pattern may mainly consist of a counting pattern together with a fixed number for the actual pair of servo tracks. Furthermore, the QIC standard specifies randomizing to be used. This technique may be used so even the bit pattern which corresponds to the actual fixed track number will be randomized. The residual noise which appears to the servo demodulators 112, 114 after the low pass filters 108, 110 and the band pass filter (if used) therein, will be low and random, and the noise does not contribute to any fixed disturbances to the normal servo signal. Therefore, the low pass filters 108, 110 in FIG. 6 are sufficient to remove the embedded track number and tape position signal from the signal passed to the servo demodulators 112, 114.

With respect to the read signal processing and decoding of the encoded servo track pair and longitudinal tape position numbers, the error rate requirements for the signals may be far from what is required for the data signals. The read signal filter blocks for modules 116, 118 may also deliver both a differential version of the read signals for magnetic transition timing decoding, and a low pass version only for magnetic transition qualification. The servo carrier noise read back together with the encoded servo track pair and longitudinal tape position information may, therefore, be partly suppressed depending on where the actual servo carrier frequency is located with respect to the actual lowest frequency of the position information signal.

However, to improve the servo carrier suppression, a band stop filter (not shown) may also be included in the read signal filter modules 116, 118. The band stop filter is bypassed during reading of normal data signals, and activated only when the servo track pair and longitudinal tape position signals are processed by the read channels. If the servo carrier frequency is sufficiently low compared with the lowest density frequency of the servo track pair and longitudinal position information signal, only a slight equalization is required to compensate for the band stop filter.

Further, the actual recording level of the servo carrier and the transition rate also determines the read signal-to-noise ratio. The apparent recording level may also be set by using equalization pulses embedded in the servo recording. Such equalization is described in the QIC-91-42 document in use for the actual 10 GByte (1, 7) ⅔ code used therein. By a proper choice of all of the system parameters, including the attenuation of the read channel band stop filter and its equalization, a sufficient signal-to-noise ratio may be set.

To implement an analog encoding method rather than a digital encoding method, two or more constant densities are alternatively encoded which correspond to allowable frequencies in the actual code use. The coded information is recorded in the erased or non-recorded rectangles in the servo pattern. For example, the coded information may consist of four frequencies for the (1, 7) ⅔ code from the lowest to the highest densities. These frequencies are detected by a phase locked loop which may be provided in the data synchronizer 120, 122. Therefore, no need for a separate or additional decoder is required.

The signal-to-noise ratio may be best when the servo heads are located between two servo tracks, i.e. the servo read head is located in the middle of the rectangle. The cyclical or partial cyclical servo track pair signal frequency may be read when the tape is running at full speed and when the servo read heads are located either slightly above or slightly below the center lines of the servo track, i.e. the embedded discrete frequency bursts or samples are read just prior to the servo lock command being issued.

With this simpler, analog discrete frequency method, there is no longitudinal tape position signal to read back. Therefore, the read channel band stop filter required to suppress the servo carrier is not required. The magnitude or level of the discrete signal frequencies may be high compared with the noise from the servo carrier when a servo read gaps are within the rectangles. As a result, the write protect reliability of the dedicated servo format for tapes may be enhanced by including an extra confirmation of which servo track pair number the read gaps are located over just prior to the issue of the servo lock command.

As a result of the foregoing, information may be recorded during the manufacture of the tape about the servo track pair and the servo sample numbers into the original erased or non-recorded tape portions between the servo track center lines. The empty tape areas may then be used for recording such information which may be done in a digital manner with a special data block format used or in an analog manner using a fixed set of predetermined frequencies.

In addition, the servo read signals may be routed into the normal data read channels. According to QIC specifications, two servo channels operate simultaneously on the same servo track and are separated from each other along the direction of the tape with one read head located on each side of a write head. Double servo reading ensures a reliable servo operation during read drop outs, and it also automatically provides for interpolation to find the position of the write head. If there is any need to confirm the track and tape position numbers prior to writing, the two read data channels and read gaps may be switched to read the same servo track with the read gaps displaced longitudinally with an equal distance on each side of the write head. The read gaps may be used to filter and decode a servo track pair number or a longitudinal tape position number, respectively. In such a case, since the two read gaps are located with an equal distance to both sides of the write gap, except for unavoidable tolerance errors, a good estimate of the write gap position may be obtained. Therefore, outputs from the selected heads used for servo tracking may be routed to both the servo demodulators and the read channels. When the track number and tape position have been found, the servo channels are disconnected from the read channels, and the normal data channels are routed to the read channels and the servo channels to the servo demodulator.

In addition, the magnetic reading/recording head may be moved at a high speed towards the desired track and tape positions without locking the servo at each intermediate track position which is significant with respect to narrow pitch formats in the range of 5 μm to 10 μm. Precise track positioning is not required until a target track has been reached since a track number position feedback is not required during the process. The positioning accuracy is further enhanced by monitoring tape position samples.

Finally, a new control loop to aid in a precise track seeking may be introduced to improve the track seeking speed. When using the digital encoding method previously discussed, a linear actuator capable of moving the head over its entire operating range may be used similar to that used in hard disk drives where access times may be in a range of approximately 10 ms. This may not be required for a serpentine tape recording format since track seeking speed must only be improved from several seconds to sub-second speeds.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method for determining servo track pair position for a tape using dedicated servo format, said tape including at least one set of data tracks and a plurality of dedicated servo tracks, wherein adjacent servo tracks are defined by longitudinal lines through edges of erased or non-recorded tape portions, said method comprising the steps of:

recording information about servo track pair numbers and/or servo sample numbers into said tape portions;

decoding said information; and reading back said information together with signals from said servo track wherein said information is recorded in an analog manner using a fixed set of predetermined frequencies.

\* \* \* \* \*